US007188983B2

(12) United States Patent
Dunn

(10) Patent No.: US 7,188,983 B2
(45) Date of Patent: Mar. 13, 2007

(54) VEHICLE LIGHTING APPARATUS AND METHOD

(75) Inventor: Matthew W. Dunn, Bellingham, WA (US)

(73) Assignee: Matthew Dunn, Bellingham, WA (US)

( * ) Notice: Subject to any disclaimer, the term of this patent is extended or adjusted under 35 U.S.C. 154(b) by 145 days.

(21) Appl. No.: 10/751,697

(22) Filed: Jan. 5, 2004

(65) Prior Publication Data

US 2005/0146889 A1    Jul. 7, 2005

(51) Int. Cl.
*B60Q 3/04* (2006.01)
(52) U.S. Cl. .................. 362/543; 362/231; 362/293
(58) Field of Classification Search ........... 362/545, 362/542, 540, 477, 231, 293, 543, 544, 230; 340/815.45, 463, 468
See application file for complete search history.

(56) References Cited

U.S. PATENT DOCUMENTS

| | | | |
|---|---|---|---|
| 2,190,035 A | | 2/1940 | Loungway |
| 4,677,533 A | * | 6/1987 | McDermott et al. ........ 362/240 |
| 4,733,335 A | * | 3/1988 | Serizawa et al. .......... 362/503 |
| 5,548,491 A | | 8/1996 | Karpen |
| 5,685,637 A | * | 11/1997 | Chapman et al. ........... 362/263 |
| 5,961,208 A | | 10/1999 | Karpen |
| 6,049,387 A | | 4/2000 | Griesinger |
| 6,224,240 B1 | | 5/2001 | Shimizu et al. |
| 6,276,822 B1 | | 8/2001 | Bedrosian et al. |
| 6,301,371 B1 | | 10/2001 | Jones et al. |
| 6,323,585 B1 | | 11/2001 | Crane et al. |
| 6,406,172 B1 | * | 6/2002 | Harbers et al. ............ 362/544 |
| 6,693,551 B2 | * | 2/2004 | Pederson ................ 340/815.45 |
| 6,824,299 B2 | * | 11/2004 | Mohri et al. .............. 362/487 |
| 2002/0021065 A1 | * | 2/2002 | Gervelmeyer et al. ...... 313/112 |
| 2002/0093829 A1 | * | 7/2002 | Pinson et al. .............. 362/520 |

OTHER PUBLICATIONS

Cox, "Flight of Fancy," retrieved on Nov. 5, 2003 at http://www.iesna.org/LDA_7-98/feature_flight1.htm, published by the IESNA, Jul. 1998, 5 pages.
McCandless, "A Method of Lighting the Stage," Theatre Arts Books, New York, NY, Fourth Edition, 1958.
McColgan, et al., "Subjective Color Preferences of Common Road Sign Materials Under Headlamp Bulb Illumination," Society of Automotive Engineers, Inc. 2002 World Congress, Detroit, MI, Mar. 4-7, 2002, 9 pages.
Stern, "Blue Headlamp Bulbs, What's All The Fuss?, " Daniel Stern Lighting Consultancy and Supply, retrieved on Nov. 5, 2003 at http://lighting.mbx.org/tech/bulbs/blue/bad/bad.html, 2002, pp. 1-10.
Chinniah, Jeyachandrabose et al., "An Approach for the Optical Design of an LED Fog Lamp", SAE International, 2004 SAE World Congress, Detroit Michigan, Mar. 8-11, 2004, 7 pages.

* cited by examiner

*Primary Examiner*—Renee Luebke
*Assistant Examiner*—Gunyoung T. Lee
(74) *Attorney, Agent, or Firm*—Lee & Hayes, PLLC

(57) ABSTRACT

A vehicle includes a first light source to project light outwardly from a vehicle. The light projected from the first light source is perceptibly dominant in a lower-frequency portion of a visible spectrum. The vehicle also includes a second light source to project light outwardly from the vehicle. The light projected from the second light source is perceptibly dominant in a higher-frequency portion of the visible spectrum.

62 Claims, 6 Drawing Sheets

VEHICLE LIGHTING APPARATUS AND METHOD

TECHNICAL FIELD

The systems and methods described herein relate to vehicle lighting arrangements.

BACKGROUND

Vehicles use lighting systems to illuminate the area in front of or around the vehicle. For example, automobiles typically have a pair of headlights near the front corners of the automobile. When the automobile is moving forward, these headlights project light ahead of the automobile to illuminate the area that the automobile will soon be driving upon, such as the road or driveway ahead of the automobile. An automobile may also use other lights, such as fog lights, driving lights and the like to illuminate the area ahead of the automobile or in the vicinity of the automobile. Other vehicles, such as trucks, buses, airplanes, boats and trains use similar lighting systems to illuminate the area in front of or around the vehicle.

Vehicle lighting systems allow an operator and/or passenger in the vehicle to see objects near the vehicle and in the path of the vehicle. In one example, an automobile lighting system illuminates the road ahead of the vehicle, including lane markings, traffic signs, curbs, etc. The lighting system also illuminates obstacles or hazards on or near the road ahead of the vehicle. For example, the lighting system can illuminate obstacles such as animals, rocks, logs and the like in the road ahead of the vehicle. Additionally, the lighting system can illuminate objects such as animals, pedestrians, or other vehicles approaching the road ahead of the vehicle (e.g., from a side road or a walking path). The adequacy with which a vehicle lighting system illuminates objects, roadways, and the like depends on various factors, such as the strength of the lighting system (i.e., intensity or brightness), the positioning of the light sources and the direction in which light is projected from the lighting system.

Vehicle lighting systems also serve to locate and identify vehicles to other parties such as other drivers and pedestrians, particularly but not exclusively during darkness. The presence, direction and motion of the vehicle lighting system are important clues by which other parties locate vehicles in the absence of other light. The lighting system is a visible signal of the presence of a vehicle in conventional nighttime traffic. In the case of multiple vehicles, the lighting system provides a mechanism by which operators count, separate, and track the motions of other vehicles.

The systems and methods described herein provide an enhanced vehicle lighting arrangement that utilizes multiple light sources having different light characteristics.

BRIEF DESCRIPTION OF THE DRAWINGS

Similar reference numbers are used throughout the figures to reference like components and/or features.

DETAILED DESCRIPTION

Figure 1:
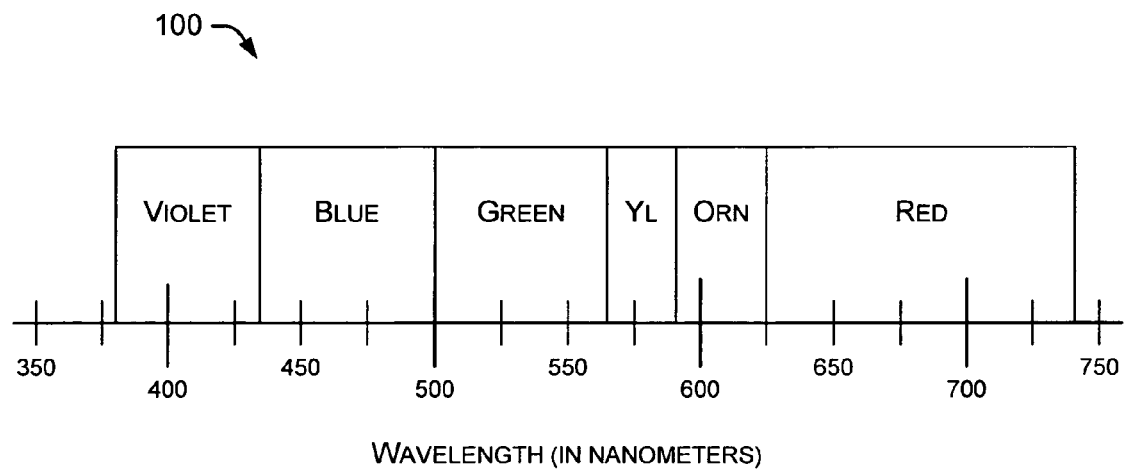
FIG. 1 illustrates the visible light region of the electromagnetic spectrum (or visible spectrum).

The systems and methods described herein provide illumination for vehicles. Various vehicle lighting systems and modifications to existing vehicle lighting systems are described herein. These described lighting systems utilize two or more light sources, each having a measurable or perceptible difference of spectral energy distribution. For example, one light source may transmit light with a visibly higher intensity of wavelengths toward the higher-frequency (e.g., blue) portion of the visible spectrum, and another light source may transmit light visibly more intense in the lower-frequency (e.g., red) portion of the visible spectrum. The systems and methods described herein enhance the illumination of areas in the vicinity of a vehicle, such as the area ahead of a vehicle. By providing multiple light sources on a vehicle that project light perceptibly or measurably dominant in different portions of the visible spectrum, the areas and/or objects are better illuminated by the light sources, and the identity, location, and direction of the vehicle more accurately distinguished from other vehicles during periods of darkness.

The improvements in illumination created by the systems and methods described herein pertain to visual perception of the shape and distance of objects, and of their movement and direction. The described lighting systems and methods enhance perception of these attributes by providing perceptibly-color-contrasted illumination of the surfaces of an object based on their reflection of contrasting light sources with differing points of origin, angle, and reflectance. The human visual system uses the increased information provided by contrasting color to resolve shape and distance more accurately.

As used herein, a vehicle includes any device capable of moving objects or individuals from one place to another. Example vehicles include cars, trucks, buses, motorcycles, snowmobiles, boats, trains and airplanes. Vehicles include both military vehicles and civilian vehicles. Vehicles also include both on-road vehicles and off-road vehicles.

As used herein, the term "light emitting device" includes any device or object capable of emitting light. Light emitting devices include, for example, light bulbs of any type, light emitting diodes (LEDs), lasers and the like.

As used herein, the term "light source" refers to a device or component that projects or emits light. In particular embodiments, a light source is simply a light emitting device. In other embodiments, a light source is a headlight assembly including, for example, a light emitting device, a reflector and a lens. Additionally, a particular headlight assembly may include a cover, a shield, an additional lens, or some other component that modifies the light projected from the headlight (e.g., blocking light having certain wavelengths or blocking light emitted in a particular direction).

As used herein, the term "lighting system" refers to a system containing two or more light sources. For example, a vehicle lighting system may include two headlights and two fog lights.

Particular examples discussed herein refer to light projected from vehicle headlights. However, the systems and methods described herein can be applied to any vehicle light source, such as headlights, driving lights, fog lights, aircraft landing lights, spotlights and the like. Further, a vehicle light source may be located anywhere on a vehicle. Particular examples discussed herein illustrate light sources positioned near the front of a vehicle. In alternate embodiments, light sources may be positioned on the roof of a vehicle, on a door of the vehicle, on the side of the vehicle, within a cavity in the vehicle, on a wing of the vehicle, extended from the vehicle, or any other position at which a light source can be affixed.

The human eye contains several light-sensing components. Initially, light passes through the cornea, then the aqueous humor, lens and vitreous humor. Eventually, the light reaches the retina, which is the light-sensing structure of the human eye. The retina is made up of two types of cells: cones and rods. Cones are nerve cells that are sensitive to light, detail, and color. Millions of cone cells are packed into the macula (a central area of the retina), aiding it in providing the visual detail needed to read the words on a printed page, see a street sign, or read other materials.

Cones are also responsible for creating the sensation referred to as color. Cones contain three different pigments, each of which responds to blue, red, or green wavelengths of light (i.e., blue-sensitive pigment, red-sensitive pigment, and green-sensitive pigment). The cones mix the color signals to produce the variety of colors humans see.

The human eye is capable of perceiving hue, saturation and brightness characteristics of a light source or of light reflected by an object. Hue, saturation and brightness are the three primary attributes of color. Hue is related to the wavelength of spectral colors (e.g., the visible spectrum discussed below). Hue is used to describe differences between colors. Terms such as "red" or "green" are primarily describing hue. Saturation is related to variations of (or differences within) a color. For example, pink may be considered as having the same hue as red but being less saturated. A fully saturated color (e.g., red) is one with no mixture of white, whereas a less saturated color (e.g., pink) includes the primary color (red) combined with some amount of white. Brightness refers to the perception regarding the amount of light emitted by a source or reflected by an object. Brightness may also describe the perceived intensity of the energy output of a light source. Brightness may also be referred to as "brilliance".

FIG. 1 illustrates the visible light region 100 of the electromagnetic spectrum (also referred to as the "visible spectrum"). The visible spectrum is the portion of the electromagnetic spectrum typically visible to humans. FIG. 1 identifies the wavelengths (in nanometers) associated with different colors in the visible spectrum. The visible portion of the electromagnetic spectrum is the range of approximately 380 nanometers to approximately 740 nanometers. A nanometer is $10^{-9}$ meters. As shown in FIG. 1, the violet portion of the visible spectrum extends from approximately 380 nanometers to approximately 435 nanometers, the blue portion of the visible spectrum extends from approximately 435 nanometers to approximately 500 nanometers, and the green portion of the visible spectrum extends from approximately 500 nanometers to approximately 565 nanometers. Additionally, the yellow portion of the visible spectrum extends from approximately 565 nanometers to approximately 590 nanometers, the orange portion of the visible spectrum extends from approximately 590 nanometers to approximately 625 nanometers, and the red portion of the visible spectrum extends from approximately 625 nanometers to approximately 740 nanometers.

Figure 2:
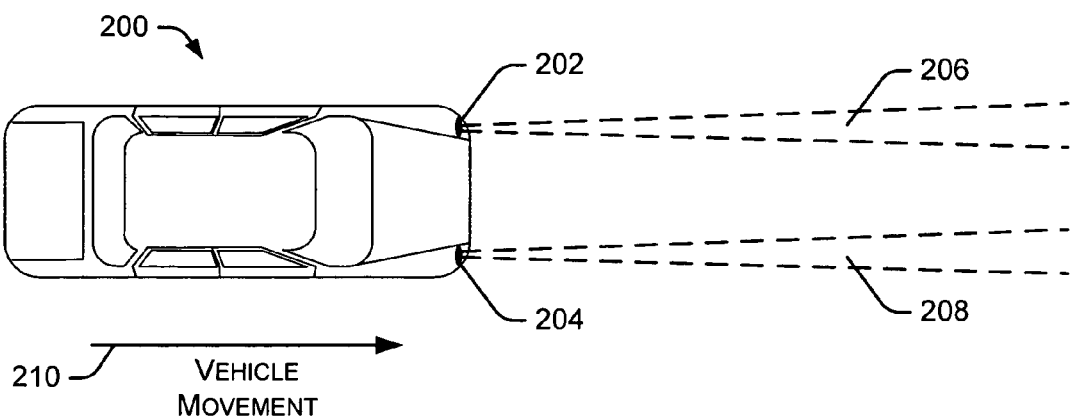
FIG. 2 illustrates an example vehicle and the light projected from the vehicle's headlights.

FIG. 2 illustrates an example vehicle 200 and the light projected from the vehicle's headlights. Vehicle 200 has two headlights 202 and 204 positioned near opposite edges of the front of the vehicle. When activated, headlight 202 projects light outwardly from the front of vehicle 200 in a light beam 206 indicated by broken lines. Additionally, headlight 204, when activated, projects light outwardly from the front of vehicle 200 in a light beam 208 indicated by broken lines. The actual shape or pattern of light beams 206 and 208 may vary based on headlight placement and positioning, vehicle position, reflector shape, lens shape, etc. Light beams 206 and 208 are particular examples that are provided for illustration purposes.

In one embodiment, vehicle 200 is moving forward, as indicated by arrow 210. When vehicle 200 is moving in this direction, the light projected from headlights 202 and 204 light an area ahead of the car (i.e., the area that the vehicle will soon be moving across). Thus, headlights 202 and 204 assist the operator and/or occupants of vehicle 200 in viewing the area ahead of the vehicle.

Figure 3:
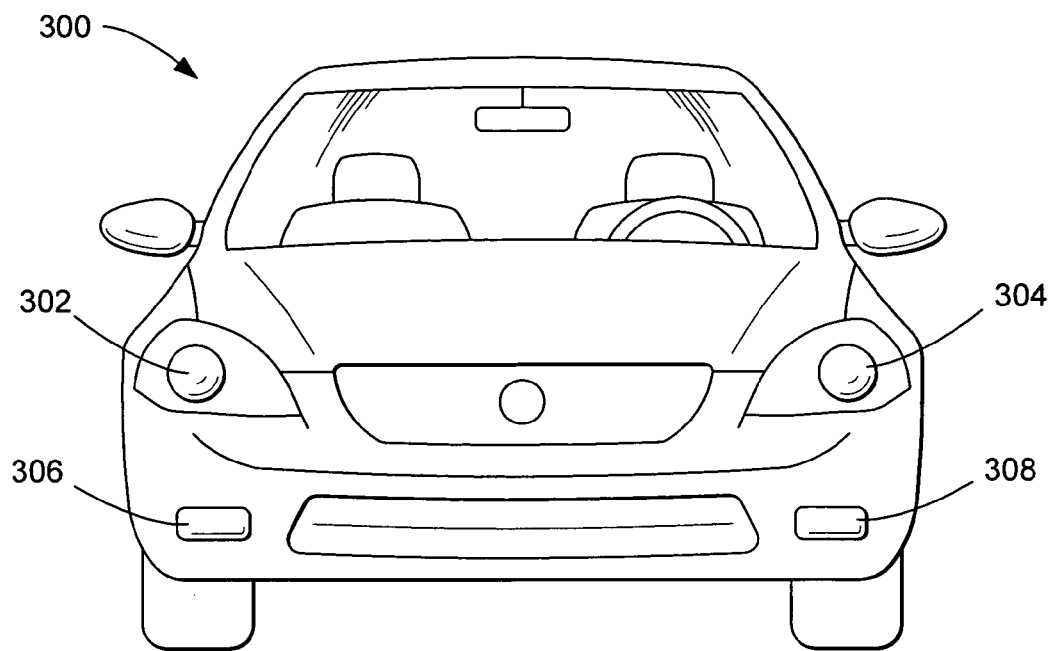
FIG. 3 illustrates an example arrangement of headlights and fog lights (or driving lights) on the front of a vehicle.

FIG. 3 illustrates an example arrangement of headlights and fog lights (or driving lights) on the front of a vehicle 300. Two headlights 302 and 304 are positioned near opposite sides of vehicle 300. Two fog lights 306 and 308 are is positioned below headlights 302 and 304. Fog lights 306 and 308 may also be referred to as driving lights or auxiliary lights. Fog lights 306 and 308 may be activated along with headlights 302 and 304 or independently of headlights 302 and 304. Although FIG. 3 illustrates a vehicle having two headlights 302 and 304 and two fog lights 306 and 308, a particular vehicle may have any number of headlights and/or any number of fog lights. Additionally, although headlights 302 and 304 are shown having a round shape, alternate headlights may have any shape, such as elliptical or rectangular. Similarly, although fog lights 306 and 308 are shown having a rectangular shape, alternate fog lights may have any shape, such as elliptical or round.

Figure 4:
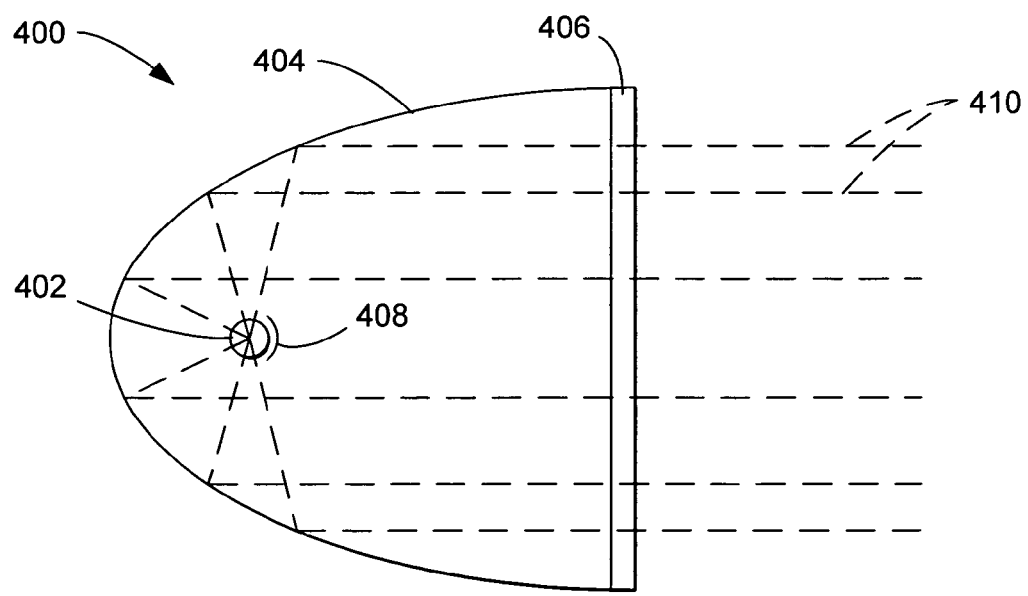
FIG. 4 illustrates a side view of an example vehicle headlight.

FIG. 4 illustrates a side view of an example vehicle headlight 400. A vehicle headlight may also be referred to as a "head lamp". Headlight 400 includes a light emitting device 402 substantially surrounded by a reflector 404. Reflector 404 may be constructed, for example, from steel or any number of composite materials. Reflector 404 is shaped to reflect light from light emitting device 402 out the front of the headlight, as indicated by the broken lines 410. Although not shown in FIG. 4, an electricity source (such as a battery, alternator, or a generator) provides the electricity used by light emitting device 402 to generate light.

Headlight 400 includes a lens 406 constructed, for example, from a glass or plastic material. A particular embodiment of lens 406 allows significantly all light to pass through the lens and out of headlight 400. In other embodiments, discussed below, lens 406 may filter light having particular wavelengths (or ranges of wavelengths) such that light having those particular wavelengths are not projected from headlight 400.

Headlight 400 also includes an optional light shield 408 located near light emitting device 402. Light shield 408 prevents light from passing directly from light emitting device 402 to lens 406. Light shield 408 may have a reflective surface such that light reflects off light shield 408 to reflector 404, which reflects the light to lens 406. Light shield 408 may be of any shape and size. Alternate embodiments of headlight 400 omit light shield 408.

Figure 5:
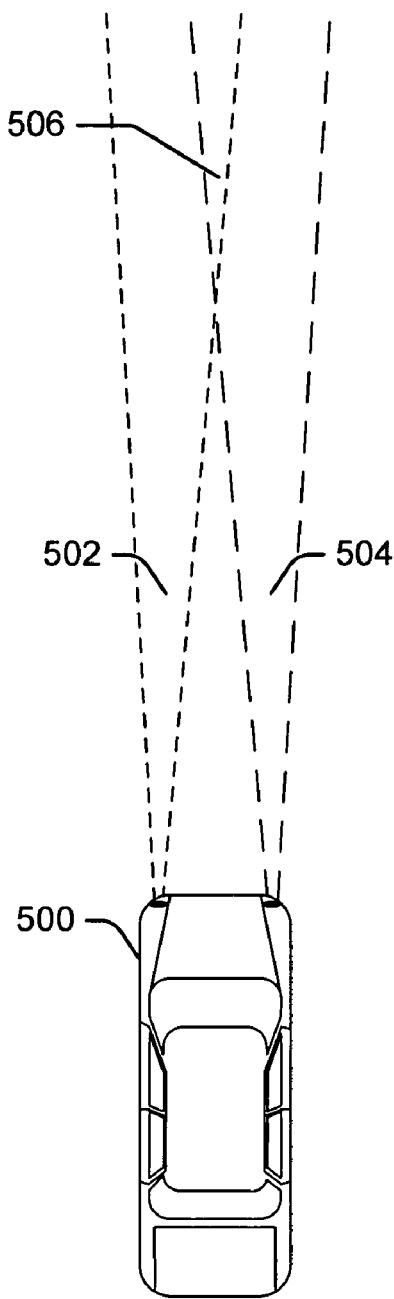
FIG. 5 illustrates an example vehicle having two headlights that project light saturated in perceptibly or measurably different portions of the visible spectrum.

FIG. 5 illustrates an example vehicle 500 having two headlights that project light saturated in perceptibly or measurably different portions of the visible spectrum. As discussed above with respect to FIG. 1, the visible spectrum ranges from wavelengths of approximately 380 nanometers to approximately 740 nanometers. In the example of FIG. 5, vehicle 500 has two headlights that project light outwardly from the same side (e.g., the front) of the vehicle. One headlight projects a first light beam 502 and the other headlight projects a second light beam 504.

The first light beam 502 includes wavelengths that are predominantly in the red portion of the visible spectrum and the second light beam 504 includes wavelengths that are predominantly in the blue portion of the visible spectrum. In other words, the first light beam 502 is saturated toward the blue end of the visible spectrum and the second light beam 504 is saturated toward the red end of the visible spectrum. This use of light beams having wavelengths predominantly in different portions of the visible spectrum enhances the illumination of objects and/or areas ahead of the vehicle. For example, at an area 506 in FIG. 5, light beams 502 and 504 intersect one another. In this area 506, illumination is enhanced because light predominantly in the red portion of the visible spectrum is illuminating the area as well as light predominantly in the blue portion of the visible spectrum. The enhanced illumination allows an operator and/or passenger in vehicle 500 to make better spatial distinctions, such as the shape, size and distance of objects ahead of vehicle 500.

In a particular embodiment, light beams 502 and 504 are projected substantially parallel to one another. Although light beams 502 and 504 typically intersect one another, that intersection may occur, for example, several hundred feet in front of the vehicle. Thus, light beams 502 and 504 are said to be substantially parallel to one another even though they may at least partially intersect one another. Further, the headlights that generate light beams 502 and 504 are substantially the same distance (e.g., height) from the road or other surface on which the vehicle is located. Thus, the headlights are in a plane that is substantially parallel to the surface on which the vehicle is located.

In one embodiment, the first light beam 502 and the second light beam 504 are perceptibly different in color. A perceptible difference in color is any difference that can be detected by a typical human eye viewing the two light beams. For example, the human eye may perceive different colors in the two light beams (such as red vs. blue) or different levels of saturation of the same color (such as pink vs. red). In one example, to perceive a difference in color between the two light beams, the combination of frequencies are different from one another. In another example, to perceive a difference in color between the two light beams, the relative energies of similar combinations of frequencies are different from one another.

In another embodiment, the first light beam 502 and the second light beam 504 are measurably different in color saturation. A measurable difference in color saturation is any measurable difference of spectral energy between the two light beams. In one embodiment, the two light beams contain light that is measurably different in the combination of frequencies emitted.

In another embodiment, the first light beam 502 and the second light beam 504 are measurably different in color saturation but not perceptibly different in color as emitted. As objects reflect and absorb different parts of the visible spectrum depending on their physical properties, the reflected light (i.e., reflected by the objects) may be perceptibly different in color.

In particular embodiments, light beams 502 and 504 may have perceptibly different tints (or hues) to a person viewing the light beams. In the example discussed above, light beam 502 appears to have a reddish or orange tint compared with light beam 504, which appears to have a blue or green tint. This contrast in the appearance of light beams 502 and 504 may allow individuals to better distinguish vehicles at night or in low-light conditions. For example, in a group of overlapping vehicles, it may be easier to distinguish vehicles or determine the number of vehicles in the group.

Figure 6:
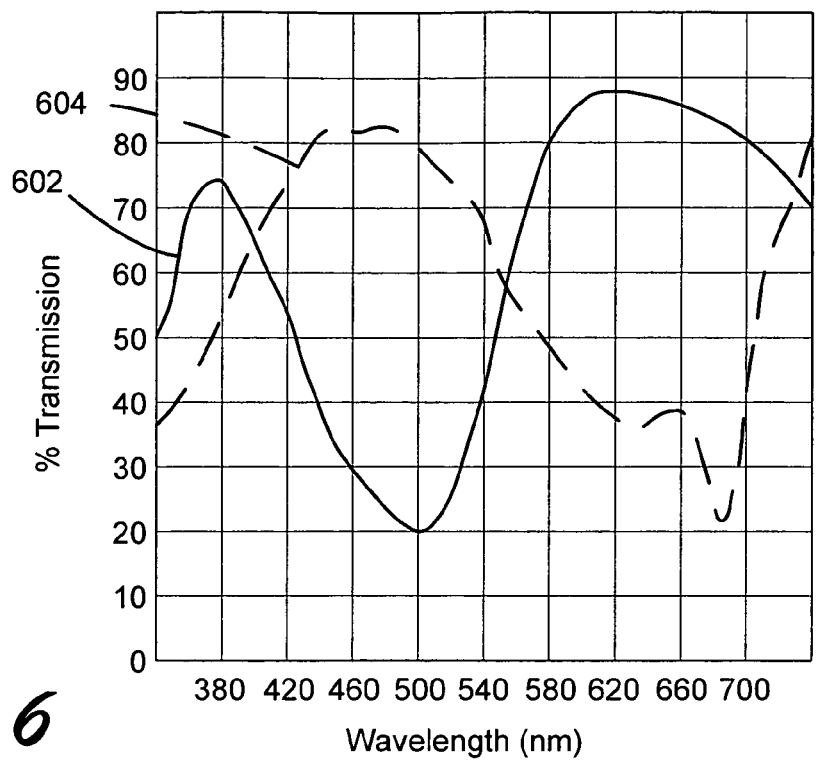
FIGS. 6 and 7 illustrate example characteristics of light projected from the headlights of the vehicle in FIG. 5.
Figure 7:
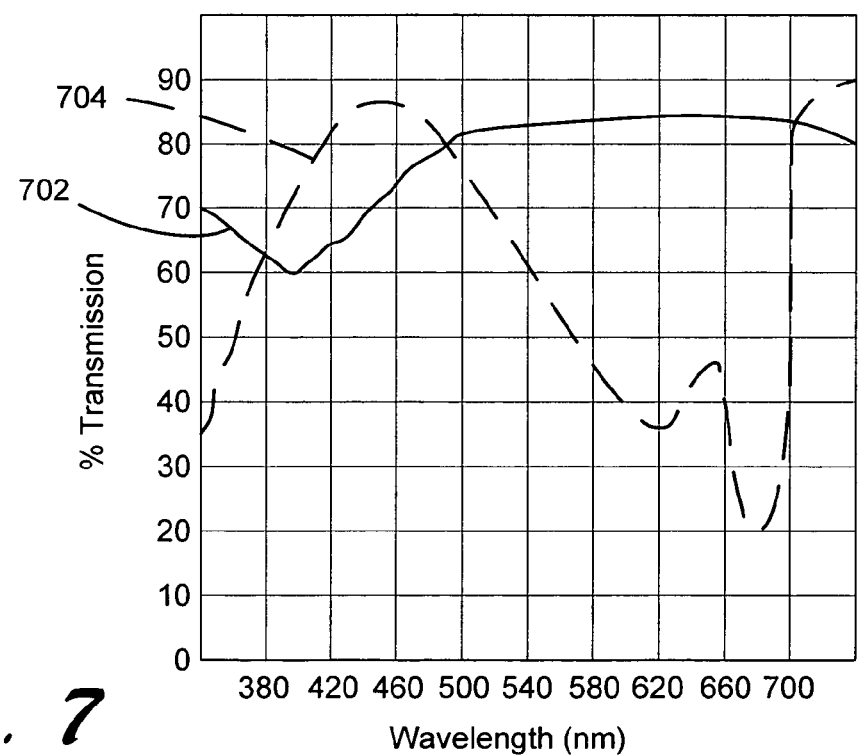

FIGS. 6 and 7 illustrate example characteristics of light projected from the headlights of the vehicle in FIG. 5. The horizontal axis displays the frequency range of visible light wavelengths. The vertical axis indicates the relative amount of energy transmitted in each frequency range. Referring to FIG. 6, a first curve 602 represents the light characteristics of a light source (such as a headlight) saturated toward the red end of the visible spectrum. A second curve 604 represents the light characteristics of a light source saturated toward the blue end of the visible spectrum. The particular wavelengths shown in FIG. 6 represent one possible set of values. Alternate embodiments may use different values and curves 602 and 604 may have different shapes and positions. In these alternate embodiments, the curve associated with one light source is saturated toward the red end of the visible spectrum while the other light source is saturated toward the blue end of the visible spectrum. As shown in FIG. 6, curve 602 represents light with characteristics predominantly in the red portion of the visible spectrum and curve 604 represents light with characteristics predominantly in the blue portion of the visible spectrum. In one implementation, curve 602 is associated with a "salmon pink" color and curve 604 is associated with an "aquamarine" color. Curves 602 and 604 illustrate a significant difference in characteristics of light sources that are dominant in different portions of the visible spectrum.

Referring to FIG. 7, a first curve 702 represents the light characteristics of a light source saturated toward the red end of the visible spectrum. A second curve 704 represents the light characteristics of a light source saturated toward the blue end of the visible spectrum. Although curve 704 is not centered in the blue portion of the visible spectrum, it is saturated toward the blue end of the visible spectrum with respect to curve 702. As shown in FIG. 7, curve 702 represents light characteristics predominantly in the red portion of the visible spectrum and curve 704 represents light characteristics predominantly in the blue portion of the visible spectrum. The particular wavelengths shown in FIG. 7 represent example values. Alternate embodiments may use different values and curves 702 and 704 may have different shapes and positions. In one implementation, curve 702 is associated with a "straw" color and curve 704 is associated with a "blue" color. Curves 702 and 704 illustrate a more subtle difference in characteristics of light sources (as compared to FIG. 6).

In one embodiment, curve 604 represents the light characteristics of light beam 504 (FIG. 5) and curve 602 represents the light characteristics of light beam 502. In another embodiment, curve 704 represents the light characteristics of light beam 504 and curve 702 represents the light characteristics of light beam 502.

The examples of FIGS. 6 and 7 represent light characteristics in the visible spectrum. In particular embodiments, additional light may be emitted in non-visible portions of the electromagnetic spectrum (i.e., not visible to humans). Thus, in certain embodiments, the light projected from a light source may have a dominant range of wavelengths outside the visible spectrum. In these embodiments, the light projected in the visible spectrum is still predominantly in the higher portion of the visible spectrum for one light source and in the lower portion of the visible spectrum for the second light source.

A typical human vision system is capable of making relatively small distinctions between colors. The examples shown in FIGS. 6 and 7 are provided to show different spectral energy distributions. A typical human vision system is capable of distinguishing between light sources with greater similarities than those shown in FIGS. 6 and 7.

Figure 8:
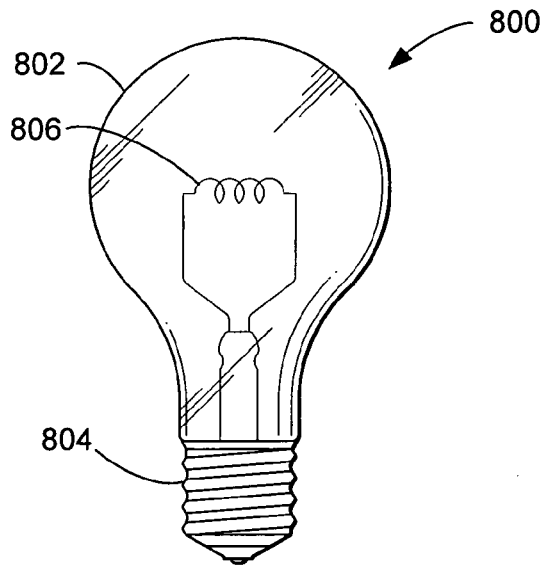
FIGS. 8 and 9 illustrate examples of light bulbs that may be used in a vehicle headlight.
Figure 9:
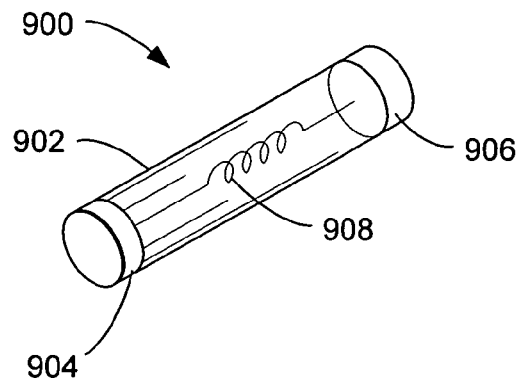

FIGS. 8 and 9 illustrate examples of light bulbs 800 and 900 that may be used in a vehicle headlight or other light source. Referring to FIG. 8, light bulb 800 includes a glass envelope 802 coupled to a base portion 804. A filament 806 within glass envelope 802 emits light as electrical current flows through the filament and heats the filament. In one embodiment, filament 806 is a tungsten filament.

Referring to FIG. 9, light bulb 900 includes a glass envelope 902 with a pair of conductive end caps 904 and 906. Conductive end caps 904 and 906 are electrically coupled to opposite ends of a filament 908 contained in envelope 902. Filament 902 emits light when electrical current flows through the filament, thereby heating the filament.

Light bulbs 800 and 900 are merely examples of light bulbs that can be part of a light source. In alternate embodiments, a light source (such as a vehicle headlight) may include any type of bulb or other device having any type of filament or other mechanism capable of emitting light.

Figure 10:
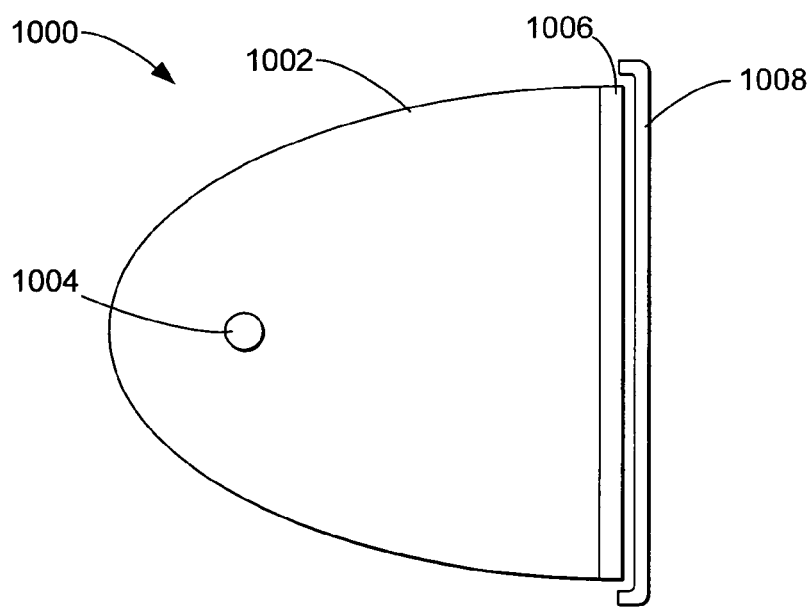
FIG. 10 illustrates an example vehicle headlight with a cover over a portion thereof.

FIG. 10 illustrates an example vehicle headlight 1000 with a cover over a portion thereof. Headlight 1000 includes a reflector 1002 that substantially surrounds a light emitting device 1004. In a particular embodiment, reflector 1002 has a generally parabolic shape. Light emitting device 1004 may be a light bulb, a light source, an array of LEDs, or any other device capable of emitting light. A lens 1006 is attached to the opening of the reflector. Additionally, a cover 1008 is attached to headlight 1000 over lens 1006. Cover 1008 may also be referred to as a "second lens". In this example, vehicle headlight 1000 is a typical headlight that emits light across a large portion of the visible spectrum. However, the addition of cover 1008 filters the light that passes through lens 1006 such that the light passing through cover 1008 is saturated toward the blue end of the visible spectrum or the red end of the visible spectrum. Cover 1008 may be permanently attached to headlight 1000 or detachably mounted to headlight 1000. For example, cover 1008 may be attached to headlight 1000 using any fastening mechanism, such as glue, double-sided adhesive tape, hook and loop fasteners, or mounting clips that engage headlight 1000.

Cover 1008 can be added to a vehicle headlight after the vehicle has been manufactured. For example, a vehicle owner can purchase two covers: one that passes light saturated toward the blue end of the visible spectrum and another that passes light saturated toward the red end of the visible spectrum. Thus, a vehicle with conventional headlights can be easily modified to project light having different characteristics, as discussed herein.

In a particular embodiment, a headlight or other light source may contain two or more light emitting devices that emit light predominantly in different portions of the visible spectrum. For example, a single device may contain two light emitting devices, such as multiple light emitting diodes. In this example, the light projected from a first source is perceptibly or measurably more saturated (e.g., more intense) on the lower end of the spectrum. The light projected from a second source is perceptibly or measurably more intense on the higher end of the spectrum.

In another embodiment, a reflector associated with a light source (such as a headlight reflector) is designed such that two separate light beams are created from a single light emitting device. One light beam is saturated toward the red portion of the visible spectrum and the other light beam is saturated toward the blue portion of the visible spectrum. In one embodiment, a single source of light is split or reflected into two or more light beams such that the two light beams "emerge" as different sources. By varying the reflectors or and/or filters associated with each light beam, the two light beams can have different saturation and/or intensity curves. For example, as discussed above, one light beam is perceptibly or measurably more saturated (e.g., more intense) on the lower end of the spectrum. The light projected from the second light beam is perceptibly or measurably more saturated (or more intense) on the higher end of the spectrum.

Figure 11:
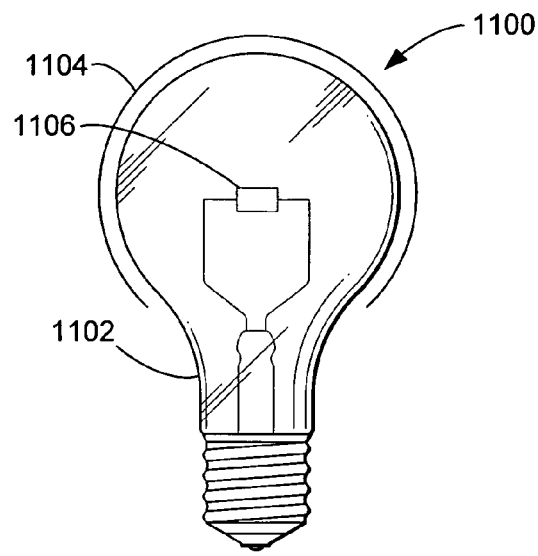
FIG. 11 illustrates an example light bulb having a cover over a portion thereof.

FIG. 11 illustrates an example light bulb 1100 having a cover over a portion thereof. Light bulb 1100 includes a glass envelope 1102 that substantially surrounds a filament 1106 that is capable of emitting light. A cover 1104 surrounds a substantial portion of envelope 1102. Cover 1104 may also be referred to as a "lens". In one embodiment, light bulb 1100 emits light across a substantial portion of the visible spectrum. Cover 1104 filters the light from light bulb 1100 such that the light passing through cover 1104 is saturated toward the blue end of the visible spectrum or the red end of the visible spectrum. In alternate embodiments, light bulb 1100 has a film or coating applied to the envelope that filters the light emitted from filament 1106 in the same manner as cover 1104. These embodiments allow a conventional headlight or other light source to be "upgraded" by replacing the light bulb with a new bulb that is coated or has a film over the envelope to filter the light projected from the light bulb. Alternatively, a conventional headlight can be "upgraded" by adding a cover to the light bulb in the headlight. Similar covers, coatings, or films can be applied to any type of light bulb or light emitting device.

Figure 12:
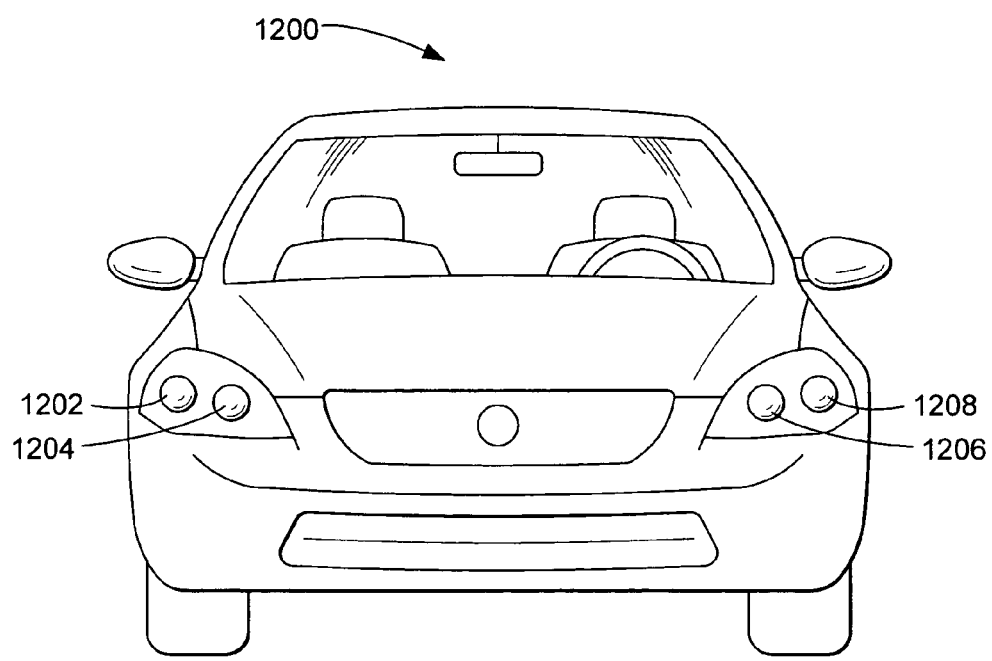
FIG. 12 illustrates an example arrangement of four headlights on the front of a vehicle.

FIG. 12 illustrates an example arrangement of four headlights on the front of a vehicle 1200. A first headlight 1202 projects light saturated toward the blue end of the visible spectrum and a second headlight 1208 projects light saturated toward the red end of the visible spectrum. The remaining headlights 1204 and 1206 are conventional headlights that project light across a substantial portion of the visible spectrum. In one embodiment, first and second headlights 1202 and 1208 are the vehicle's low-beam headlights and the remaining headlights 1204 and 1206 are the vehicle's high-beam headlights.

Figure 13:
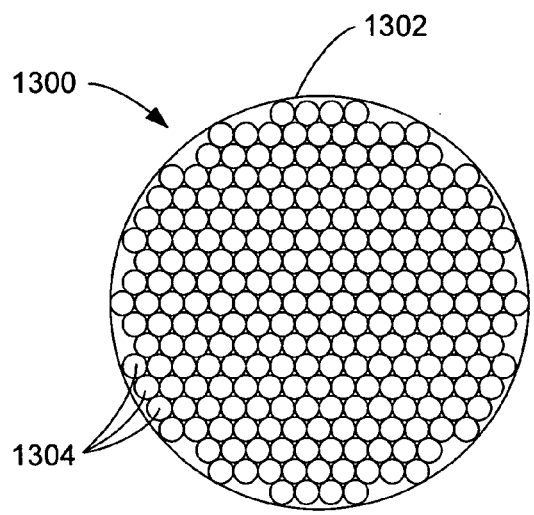
FIG. 13 illustrates an example vehicle light source containing multiple light emitting diodes (LEDs).

FIG. 13 illustrates an example vehicle light source 1300 containing multiple light emitting diodes (LEDs). Light source 1300 may be contained in a headlight or otherwise positioned such that light is projected outwardly from the light source. In one embodiment, light source 1300 has a circular housing 1302 within which are positioned multiple LEDs 1304. Light source 1300 may include any number of LEDs 1304 arranged in any shape or configuration. In one embodiment, the multiple LEDs 1304 emit light at different wavelengths. By selecting LEDs based on their light emission wavelengths, the overall range of wavelengths projected by light source 1300 can be predetermined. In an alternate embodiment, some or all of LEDs 1304 are replaced with other light emitting devices, such as miniature light bulbs.

In another embodiment, a single light source is distributed to multiple locations using, for example, fiber optic technology. Each location may split or separate the light into perceptibly or measurably different colors, intensities, or frequency ranges. For example, a single light source is distributed to a location proximate each of two headlights in a vehicle. At one headlight, the light source is split (or filtered) such that the light projected is perceptibly or measurably more intense on the higher end of the spectrum. At the other headlight, the light source is split (or filtered) such that the light projected is perceptibly or measurably more intense on the lower end of the spectrum. Alternatively, the light source may be split or separated near the light source and then distributed to each of the headlights in the vehicle. In this alternative embodiment, the light is split or separated into two groups such that one group is distributed to a first headlight and the other group is distributed to a second headlight.

In other embodiments, the emitted light characteristics are altered by changing the gas or other compounds contained in a light bulb or other lighting assembly. These changes may include altering the amount of gas in a light bulb, altering the types and amounts of gasses combined in a light bulb, and altering the pressure (or lack of pressure) in a light bulb.

Although the description above uses language that is specific to structural features and/or methodological acts, it is to be understood that the invention defined in the appended claims is not limited to the specific features or acts described. Rather, the specific features and acts are disclosed as example forms of implementing the invention.

The invention claimed is:

1. A vehicle comprising:
   a first headlight having a first light source to project light outwardly from the vehicle, wherein the light projected from the first headlight is perceptibly dominant in a lower-frequency portion of a visible spectrum; and
   a second headlight having a second light source to project light outwardly from the vehicle, wherein the light projected from the second headlight is perceptibly dominant in a higher-frequency portion of the visible spectrum, wherein the first headlight and the second headlight project light to simultaneously illuminate an area with perceptibly different-frequencies of light from different perspectives,
   wherein each of the first headlight and the second headlight provides a substantially homogeneous light beam, and
   wherein the first headlight is physically different than the second headlight.

2. A vehicle as recited in claim 1 wherein the first light source also projects light outside the visible spectrum.

3. A vehicle as recited in claim 1 wherein the light projected from the first light source and the second light source illuminates an area proximate to the vehicle.

4. A vehicle as recited in claim 1 wherein the light projected from the first light source and the second light source assists an operator of the vehicle in viewing an area ahead of the vehicle.

5. A vehicle as recited in claim 1 wherein the first light source and the second light source project light in a continuous manner.

6. A vehicle as recited in claim 1 wherein the first light source and the second light source are separated by approximately the width of the vehicle.

7. A vehicle as recited in claim 1 wherein, as the vehicle travels in a forward direction, the first light source is positioned towards the center of the road with respect to the second light source.

8. A vehicle as recited in claim 1 further comprising a third light source to project light outwardly from the vehicle, wherein the third light source projects light having wavelengths across a majority of the visible spectrum.

9. A vehicle as recited in claim 1 wherein the first light source is a bulb.

10. A vehicle as recited in claim 1 wherein the first light source is a bulb with an associated lens disposed adjacent the bulb, wherein light that passes through the associated lens is perceptibly dominant in the lower-frequency portion of the visible spectrum.

11. A vehicle as recited in claim 1 wherein the first light source is a bulb with an associated coating disposed on at least a portion of the bulb, wherein light that passes through the associated coating is perceptibly dominant in the lower-frequency portion of the visible spectrum.

12. A vehicle as recited in claim 1 wherein the first light source has an associated lens disposed adjacent the headlight.

13. A vehicle as recited in claim 1 wherein the first light source includes a plurality of light emitting devices in close proximity to one another.

14. A vehicle as recited in claim 1 wherein the first light source includes a plurality of light emitting diodes (LEDs).

15. A vehicle as recited in claim 1 wherein the vehicle is an automobile.

16. A vehicle as recited in claim 1 wherein the first light source and the second light source project light substantially in the direction of primary movement of the vehicle.

17. A vehicle as recited in claim 1 wherein the first light source and the second light source are substantially the same distance from a surface on which the vehicle is located.

18. A vehicle as recited in claim 1 wherein the first light source and the second light source project light outwardly from a common side of the vehicle.

19. A vehicle as recited in claim 1 wherein light is projected from the first source substantially parallel to light projected from the second light source.

20. A vehicle as recited in claim 1, wherein the first light source comprises a light bulb, and the second light source comprises a light bulb containing a different type, amount, and/or pressure of gas than the light bulb of the first light source.

21. A vehicle comprising:
   a first headlight having a first light source that projects light outwardly from the vehicle, wherein the light projected from the first headlight is measurably dominant in a low-frequency portion of a visible spectrum; and
   a second headlight having a second light source that projects light outwardly from the vehicle, wherein the light projected from the second headlight is measurably dominant in a high-frequency portion of the visible spectrum, wherein the first headlight and the second headlight project light to simultaneously illuminate an area with measurably different-frequencies of light from different perspectives, wherein each of the first headlight and the second headlight provides a substantially homogeneous light beam, and wherein the first light source and the second light source are separated by approximately the width of the vehicle.

22. A vehicle as recited in claim 21 wherein the light projected from the first headlight and the second headlight illuminate an area proximate the vehicle.

23. A vehicle as recited in claim 21 wherein the first headlight and the second headlight are separated by approximately the width of the vehicle.

24. A vehicle as recited in claim 21 wherein the first light source is a bulb.

25. A vehicle as recited in claim 21 wherein the first headlight includes a bulb with an associated lens disposed adjacent the bulb, and wherein light that passes through the associated lens is measurably dominant in the low-frequency portion of a visible spectrum.

26. A vehicle as recited in claim 21 wherein the first headlight includes a bulb with an associated coating disposed on at least a portion of the bulb, and wherein light that passes through the associated coating is measurably dominant in the low-frequency portion of a visible spectrum.

27. A vehicle as recited in claim 21 wherein the first light source and the second light source are substantially the same distance from a surface on which the vehicle is located.

28. A vehicle as recited in claim 21 wherein the first light source and the second light source project light outwardly from a common side of the vehicle.

29. A vehicle comprising:
a first headlight comprising a first light source to project light outwardly from the vehicle, wherein the majority of the light projected from the first headlight in the visible spectrum contains wavelengths less than 550 nanometers; and
a second headlight comprising a second light source spaced apart from the first light source, the second headlight to project light outwardly from the vehicle, wherein the majority of the light projected from the second headlight in the visible spectrum contains wavelengths greater than 550 nanometers, and wherein the first headlight and the second headlight project light to simultaneously illuminate an area with different-frequencies of light from different perspectives,
wherein each of the first headlight and the second headlight provides a substantially homogeneous light beam, and
wherein the first light source and the second light source are separated by approximately the width of the vehicle.

30. A vehicle as recited in claim 29 wherein the light projected from the first light source and the second light source illuminates an area ahead of the vehicle.

31. A vehicle as recited in claim 29 wherein when the vehicle is positioned on a road, the second light source is located toward the middle of the road with respect to the first light source.

32. A vehicle as recited in claim 29 wherein the first light source includes a lens disposed adjacent a light emitting device, and wherein the lens filters out a majority of the light from the light emitting device having wavelengths less than 400 nanometers.

33. A vehicle as recited in claim 29 wherein the first light source includes a lens disposed adjacent a light emitting device, and wherein the lens filters out a majority of the light from the light emitting device having wavelengths greater than 550 nanometers.

34. A vehicle as recited in claim 29 wherein the second light source includes a lens disposed adjacent a light emitting device, and wherein the lens filters out a majority of the light from the light emitting device having wavelengths less than 550 nanometers.

35. A vehicle as recited in claim 29 wherein the second light source includes a lens disposed adjacent a light emitting device, and wherein the lens filters out a majority of the light from the light emitting device having wavelengths greater than 700 nanometers.

36. A vehicle as recited in claim 29 wherein the first light source is positioned proximate a first side of the vehicle and the second light source is positioned proximate an opposite side of the vehicle.

37. A vehicle comprising:
a first headlight comprising a first light source to project light outwardly from a first side of the vehicle; and
a second headlight comprising a second light source spaced apart from the first light source, the second headlight to project light outwardly from the first side of the vehicle, wherein the second headlight projects light measurably in a blue portion of a visible spectrum, wherein the first and second headlights assist a vehicle operator in viewing an area proximate the vehicle,
wherein the first headlight and the second headlight are substantially the same distance from a surface on which the vehicle is located,
wherein the first headlight and the second headlight are physically different,
wherein each of the first headlight and the second headlight provides a substantially homogeneous light beam, and
wherein the first headlight and the second headlight project light to simultaneously illuminate an area with measurably different-frequencies of light from different perspectives.

38. A vehicle as recited in claim 37 wherein the first light source projects light measurably in a red portion of the visible spectrum.

39. A vehicle as recited in claim 37 wherein the second light source includes a lens disposed adjacent a light emitting device, and wherein the lens filters out a majority of the light from the light emitting device having wavelengths outside the blue portion of the visible spectrum.

40. A vehicle comprising:
a first headlight comprising a first light source to project light outwardly from a first side of the vehicle; and
a second headlight comprising a second light source spaced apart from the first light source by approximately the width of the vehicle, the second headlight to project light outwardly from the first side of the vehicle, wherein the second headlight projects light perceptibly in a red portion of a visible spectrum, and wherein the first and second headlights assist a vehicle operator in viewing an area proximate the vehicle,
wherein the first light source and the second light source are substantially the same distance from a surface on which the vehicle is located,
wherein each of the first headlight and the second headlight provides a substantially homogeneous light beam, and wherein the first light source and the second light source project light to simultaneously illuminate an area with perceptibly different-frequencies of light from different perspectives.

41. A vehicle as recited in claim 40 wherein the first light source projects light perceptibly in a blue portion of the visible spectrum.

42. A vehicle as recited in claim 40 wherein the second light source includes a lens disposed adjacent a light emitting device, and wherein the lens filters out a majority of the light from the light emitting device having wavelengths outside the red portion of the visible spectrum.

43. A vehicle comprising:
   a first headlight comprising a first light source to project light outwardly from the vehicle;
   a first lens positioned such that a significant portion of the light projected from the first light source passes through the first lens, wherein the light passing through the first lens in the visible spectrum is dominant in a high-frequency portion of the visible spectrum;
   a second headlight comprising a second light source to project light outwardly from the vehicle, wherein the first headlight and the second headlight project light simultaneously; and
   a second lens positioned such that a significant portion of the light projected from the second light source passes through the second lens, wherein the light passing through the second lens in the visible spectrum is dominant in a low-frequency portion of the visible spectrum,
   wherein light passing through the first and second lenses simultaneously illuminate an area with different-frequencies of light from different perspectives,
   wherein the first light source and the second light source are separated by approximately the width of the vehicle, and
   wherein each of the first and second headlights provides a substantially homogeneous light beam.

44. A vehicle as recited in claim 43 wherein the first lens is detachable from the first light source.

45. A vehicle as recited in claim 43 wherein the second lens is detachable from the second light source.

46. A vehicle as recited in claim 43 wherein the first headlight having a reflector, and wherein the lens covers an opening in the headlight reflector.

47. A vehicle as recited in claim 43 wherein the second headlight having a reflector, and wherein the second lens covers an opening in the headlight reflector.

48. A vehicle as recited in claim 43 wherein the light passing through the first lens and the light passing through the second lens illuminates an area proximate the vehicle.

49. A vehicle as recited in claim 43 wherein the first headlight and the second headlight project light in a continuous manner.

50. A vehicle as recited in claim 43 wherein the first light source is a light bulb.

51. A vehicle as recited in claim 43 wherein the first light source is a plurality of light emitting devices.

52. A vehicle comprising:
   a first headlight comprising a first plurality of light emitting devices to project light outwardly from a vehicle, wherein the first headlight projects light dominant in a red portion of a visible spectrum; and
   a second headlight comprising a second plurality of light emitting devices spaced apart from the first plurality of light emitting devices, the second headlight to project light outwardly from the vehicle, wherein the second headlight projects light dominant in a blue portion of the visible spectrum, wherein light projected from the first headlight is substantially parallel to light projected from the second headlight, and wherein the first headlight and the second headlight project light to simultaneously illuminate an area with different-frequencies of light from different perspectives,
   wherein the first headlight and the second headlight are physically different, and
   wherein each of the first and second headlights provides a substantially homogeneous light beam.

53. A vehicle as recited in claim 52 wherein each of the first plurality of light emitting devices are light emitting diodes.

54. A vehicle as recited in claim 52 wherein each of the second plurality of light emitting devices are light emitting diodes.

55. A vehicle comprising:
   a first headlight comprising a plurality of light emitting diodes (LEDs) to project light outwardly from a vehicle, wherein the first headlight projects light dominant in a higher-frequency portion of a visible spectrum; and
   a second headlight comprising a plurality of LEDs spaced apart from the first plurality of LEDs, the second headlight to project light outwardly from the vehicle, wherein the second headlight projects light dominant in a lower-frequency portion of the visible spectrum, and wherein the first headlight and the second headlight project light to simultaneously illuminate an area with different-frequencies of light from different perspectives,
   wherein the first headlight is physically different than the second headlight, and
   wherein each of the first and second headlights provides a substantially homogeneous light beam.

56. A vehicle as recited in claim 55 wherein a first LED in the first plurality of LEDs emits light having a first dominant wavelength and wherein a second LED in the first plurality of LEDs emits light having a second dominant wavelength.

57. A method illuminating an area adjacent a vehicle, the method comprising:
   projecting a first beam of light outwardly from a first headlight of the vehicle, wherein the first beam of light is measurably dominant in a first portion of a visible spectrum; and
   projecting a second beam of light outwardly from a second headlight of the vehicle which is separated from the first headlight by approximately the width of the vehicle, wherein the second beam of light is measurably dominant in a second portion of the visible spectrum, and wherein the first beam of light and the second beam of light are projected simultaneously and substantially parallel to one another to illuminate an area with measurably different-frequencies of light from different perspectives, and
   wherein each of the first beam of light and the second beam of light is substantially homogeneous.

58. A method as recited in claim 57 wherein the first beam is projected in response to activation of a first light emitting device and the second beam is projected in response to activation of a second light emitting device.

59. A method as recited in claim 57 wherein the first beam and the second beam are projected in a continuous manner.

60. A method as recited in claim 57 wherein the first beam and the second beam assist a vehicle operator in viewing the area adjacent the vehicle.

61. A method as recited in claim 57 wherein the first beam and the second beam are projected from opposite sides of the vehicle.

62. A vehicle as recited in claim 1, wherein the first light source projects light of a perceptibly salmon pink color, and the second light source projects light of a perceptibly aquamarine color.

* * * * *